United States Patent
Chai et al.

(10) Patent No.: US 8,772,426 B2
(45) Date of Patent: Jul. 8, 2014

(54) POLYMERS

(75) Inventors: Choon Kooi Chai, Overijse (BE); Luc Marie Ghislain Dheur, Brussels (BE); Benoit Koch, Hannut (BE); Stefan Klaus Spitzmesser, Brussels (BE)

(73) Assignee: Ineos Manufacturing Belgium NV, Antwerp (BE)

( * ) Notice: Subject to any disclaimer, the term of this patent is extended or adjusted under 35 U.S.C. 154(b) by 27 days.

(21) Appl. No.: 13/519,666

(22) PCT Filed: Jan. 18, 2011

(86) PCT No.: PCT/EP2011/050604
§ 371 (c)(1),
(2), (4) Date: Jun. 28, 2012

(87) PCT Pub. No.: WO2011/089112
PCT Pub. Date: Jul. 28, 2011

(65) Prior Publication Data
US 2012/0289665 A1 Nov. 15, 2012

(30) Foreign Application Priority Data
Jan. 21, 2010 (EP) .................................. 10151296

(51) Int. Cl.
C08F 210/16 (2006.01)
C08F 2/12 (2006.01)
C08F 4/6592 (2006.01)
C08F 2/44 (2006.01)

(52) U.S. Cl.
USPC .............. 526/348.5; 526/64; 526/65; 526/74; 526/126; 526/160; 526/170; 526/348.2; 526/348.3; 526/348.6; 526/904

(58) Field of Classification Search
USPC .................. 526/65, 170, 348.2, 348.3, 348.5, 526/348.6, 64, 74, 126, 160, 904
See application file for complete search history.

(56) References Cited

U.S. PATENT DOCUMENTS

| | | |
|---|---|---|
| 5,844,045 A | 12/1998 | Kolthammer et al. |
| 2003/0088037 A1 | 5/2003 | Stevens et al. |
| 2004/0044155 A1 | 3/2004 | Chai et al. |
| 2004/0077810 A1 * | 4/2004 | Marechal ...................... 526/183 |
| 2005/0131170 A1 | 6/2005 | Lai et al. |

FOREIGN PATENT DOCUMENTS

| | | |
|---|---|---|
| EP | 0 416 815 A2 | 3/1991 |
| WO | WO 2008/074689 A1 * | 6/2008 |

* cited by examiner

Primary Examiner — Fred M Teskin
(74) Attorney, Agent, or Firm — Nixon & Vanderhye, P.C.

(57) ABSTRACT

Copolymers of ethylene and α-olefins having (a) a density (D) in the range 0.900-0.940 g/cm$^3$, (b) a melt index MI$_2$ (2.16 kg, 190° C.) in the range of 0.01-50 g/10 min, (c) a melt index MI$_2$ (2.16 kg, 190° C.) and Dow Rheology Index (DRI) satisfying the equation [DRI/MI$_2$]>2.65, and (d) a Dart Drop Impact (DDI) in g of a blown film having a thickness of 25 μm produced from the copolymer satisfying the equation DDI≥1900×{1−Exp [−750(D−0.908)$^2$]}×{Exp [(0.919−D)/0.0045]}. The copolymers may be prepared using metallocene catalysis and are preferably prepared in multistage processes carried out in loop reactors in the slurry phase. The copolymers exhibit long chain branching as defined by Dow Rheology Index (DRI) and exhibit unexpected improvements in mechanical properties, in particular dart drop impact, when extruded into blown films.

20 Claims, No Drawings

POLYMERS

This application is the U.S. national phase of International Application No. PCT/EP2011/050604 filed 18 Jan. 2011 which designated the U.S. and claims priority to European Patent Application No. 10151296.0 filed 21 Jan. 2010, the entire contents of each of which are hereby incorporated by reference.

The present invention relates to polymers and in particular to copolymers comprising ethylene and α-olefins produced in the slurry phase. The copolymers may typically be produced using metallocene catalysts. The invention particularly relates to copolymers having unexpected advantages when used in the preparation of films or in coating applications.

There are several methods for the production of bimodal or broad molecular weight distribution polymers such as melt blending, reactor in series configurations or single reactor processes using a dual site catalyst system. Melt blending has the disadvantage of requiring complete homogenization with associated high costs.

Metallocene catalysts are well known for the production of polyolefins. EP 619325 describes a process for preparing polyolefins such as polyethylenes having a multimodal or at least a bimodal molecular weight distribution wherein a catalyst system comprising at least two metallocenes is used for example a bis(cyclopentadienyl) zirconium dichloride and an ethylene bis(indenyl) zirconium dichloride. The use of two different metallocenes in the same reactor results in polymers having at least a bimodal molecular weight distribution.

EP 881237 describes the production of bimodal polymers with metallocene catalysts in two reaction zones in which the metallocene is a bis tetrahydroindenyl compound.

US 2003/088037 describes the preparation of polymers by use of 2 different catalysts in a single reactor. Mixtures of different monocyclopentadienyl metallocene complexes may be used in a semi-batch reactor to produce polymers having a high and low molecular weight components. EP 989141 describes a process for the preparation of polyethylenes having a multimodal molecular weight distribution by use of metallocenes having a bis-tetrahydroindenyl structure as disclosed in EP 881237.

EP 608369 discloses substantially linear olefin polymers having the processability of highly branched low density polyethylene (LDPE) and the strength and toughness of linear low density polyethylene (LLDPE). The polymers are different from homogeneous olefin polymers having a uniform branching distribution wherein the comonomers are randomly distributed and wherein substantially all of the interpolymer molecules have the same ethylene/comonomer ratio but have an absence of long chain branching. The polymers of EP 608369 have 0.01-3 long chain branches (LCB) per 1000 C atoms of the polymer backbone and show a unique characteristic in that the $I_{21}/I_2$ value is essentially independent of molecular weight distribution (Mw/Mn).

WO 97/423323 describes copolymers of ethylene and α-olefins having specific comonomer content distribution wherein the lower molecular weight fraction has the lower comonomer content and the higher molecular weight fraction has the higher comonomer content. This is reverse of the traditional Ziegler-Matta catalysed polymers wherein the lower the molecular weight of a copolymer fraction the higher its comonomer content. The polymers are prepared in the slurry phase using monocyclopentadienyl metallocene/borate catalyst systems. The comonomer distribution of the polymers is determined by means of Cross Fractionation Chromatography (CFC).

U.S. Pat. No. 6,506,866 describes similar ethylene copolymers in which the comonomer content distribution is such that the lower the molecular weight of a fraction of the copolymer the lower the comonomer content and the higher the molecular weight of a fraction of the copolymer the higher the comonomer content. The copolymers are also suitably prepared by polymerization in slurry phase using supported constrained geometry metallocene complexes.

WO 97/44371 similarly describes polyolefin compositions having the molecular weight maximum occurring in that part of the composition that has the highest comonomer content. The polymers are suitably prepared in the gas phase in a single reactor by use of metallocene catalyst systems. The commoner distribution is expressed by means of comonomer and molecular weight partitioning factors determined by use of Temperature Rising Elution Fractionation (TREF).

WO 04/000919 describes films prepared from polyethylenes having a relatively broad compositional distribution CDBI of ≤55% and a relatively broad molecular weight distribution of about 2.5-7.0. The polymers may be prepared from hafnium bis(cyclopentadienyl) metallocene/MAO catalyst systems in a gas phase polymerized bed reactor.

WO 03/093363 describes polyethylene resins having from about 44-55 wt % of a high molecular weight polyethylene fraction and from 45-56 wt % of a low molecular weight polyethylene fraction. The high molecular weight fraction comprises a low density polymer (LLDPE) and the low molecular weight fraction comprises a high density polyethylene. The resins have a bimodal molecular weight distribution and may suitably be prepared by use of two reactors in series wherein the high density fraction is preferably prepared first so that the low density fraction is prepared in the presence of the high density fraction. For example the polymerizations may be performed in slurry loop reactors in series. Preferably the same catalyst may be used to prepare both the low and high density fractions and is preferably a metallocene preferably an ethylene bis(tetrahydroindenyl) zirconium dichloride.

WO 06/085051 describes copolymers of ethylene and α-olefins exhibiting a molecular weight distribution in the range 3.5-4.5, a melt elastic modulus G' in the range 40-150 Pa and an activation energy of flow (Ea) in the range 28-45 kJ/mol. The copolymers are suitably prepared by use of monocyclopentadienyl metallocene complexes in a single gas phase reactor and the copolymers also exhibit a relationship between melt index and melt elastic modulus (G') according to the equation $$G' > 58 - 8 \, MI \text{ for melt index} < 6.$$

More recently WO 08/074,689 describes copolymers of ethylene and α-olefins which a relationship between melt index (MI), Dow Rheology Index (DRI) and melt elastic modulus (G') according to the equations $$[DRI/MI] > 0 \text{ and } [DRI/MI] < 0.0197 G' - 0.62.$$

The copolymers are also typically prepared by use of monocyclopentadienyl metallocene complexes in the gas phase.

The aforementioned Dow Rheology Index (DRI) has been used to express a polymer's "normalized relaxation time as a result of long chain branching" and has been defined as the extent that the rheology of ethylene copolymers incorporating long chain branching into the polymer backbone deviates from the rheology of the conventional linear homogeneous polyolefins that are reported to have no long chain branching using a defined equation as described for example in U.S. Pat. No. 6,114,486.

For example EP 1260540 reports a DRI of at least $8/MI_2$, EP 1360213 a DRI of at least $20/MI_2$ and EP 1225201 a DRI of at least $5/MI_2$.

Our earlier application EP 1177225 (US 2004/044155) describes copolymers typically exhibiting a DRI of <1 prepared from monocyclopentadienyl metallocene complexes in a single gas phase reator.

We have now surprisingly found that copolymers prepared by use of metallocene catalysts, preferably in a multistage process, exhibit good processability as defined by DRI while achieving unexpected improvements in mechanical properties, in particular dart drop impact, when extruded into blown films.

Thus according to a first aspect of the present invention there is provided a copolymer of ethylene and an α-olefin said copolymer having (a) a density (D) in the range 0.900-0.940 g/cm³,
(b) a melt index $MI_2$ (2.16 kg, 190° C.) in the range of 0.01-50 g/10 min,
(c) a melt index $MI_2$ (2.16 kg, 190° C.) and Dow Rheology Index (DRI) satisfying the equation $$[DRI/MI_2]>2.65, \text{ and}$$

(d) a Dart Drop Impact (DDI) in g of a blown film having a thickness of 25 μm produced from the copolymer satisfying the equation $$DDI \geq 19000 \times \{1-Exp[-750(D-0.908)^2]\} \times \{Exp[(0.919-D)/0.0045])\}$$

The copolymers of the present invention may also be described with reference to their melt elastic modulus G' (G"=500 Pa) which is typically in the range 60 to 160 Pa and preferably in the range 80 to 120 Pa.

The copolymers of the present invention have a molecular weight distribution in the range 4.0-20, preferably in the range of 4-15.0 and most preferably in the range 4.5-12.0.

The copolymers of the present invention preferably have a density (D) in the range 0.910-0.935 g/cm³ and preferably in the range 0.915-0.933 g/cm³.

The copolymers preferably have a melt index $MI_2$ (2.16 kg, 190° C.) in the range of 0.30-50 g/10 min and most preferably in the range 0.3-5 g/10 min.

The copolymers preferably have a Dow Rheology Index (DRI) in the range 1-15 and a $[DRI/MI_2] \geq 5.0$.

The copolymers of the present invention also exhibit a comonomer partitioning factor $C_{pf} \geq 1.0$. The aforementioned WO 97/44371 describes the comonomer partitioning factor $C_{pf}$ the relevant parts of which are incorporated herein by reference.

The copolymers of the present invention may also be defined by a Dart Drop Impact (DDI)≥1000 g of a blown film having a thickness of 25 μm produced from the copolymer for the density (D) over the range of 0.9118-0.9248.

The preferred copolymers of the present invention may suitably be defined in terms of their melt elastic modulus and the relationship between melt index and Dow Rheology Index (DRI).

Thus according to another aspect of the present invention there is provided a copolymer of ethylene and an α-olefin said copolymer having (a) a density (D) in the range 0.900-0.940 g/cm³,
(b) a melt index $MI_2$ (2.16 kg, 190° C.) in the range of 0.01-50 g/10 min,
(c) a melt elastic modulus G'(G"=500 Pa) in the range 80-120 Pa, and
(d) a melt index $MI_2$ (2.16 kg, 190° C.) and Dow Rheology Index (DRI) satisfying the Equation $$[DRI/MI_2] \geq 5$$

Preferred alpha-olefins are those having C4-C12 carbon atoms. Most preferred alpha-olefins are 1-butene, 1-hexene, 4-methyl-1-pentene and 1-octene.

The preferred alpha-olefin is 1-hexene.

The novel copolymers of the present invention may suitably be prepared by use of a metallocene catalyst system comprising, preferably a monocylcopentadienyl metallocene complex having a 'constrained geometry' configuration together with a suitable activator.

Examples of monocyclopentadienyl or substituted monocyclopentadienyl complexes suitable for use in the present invention are described in EP 416815, EP 418044, EP 420436 and EP 551277.

Suitable complexes may be represented by the general formula:

wherein Cp is a single cyclopentadienyl or substituted cyclopentadienyl group optionally covalently bonded to M through a substituent, M is a Group IVA metal bound in a $\eta^5$ bonding mode to the cyclopentadienyl or substituted cyclopentadienyl group, X each occurrence is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms or optionally one X together with Cp forms a metallocycle with M and n is dependent upon the valency of the metal.

Preferred monocyclopentadienyl complexes have the formula:

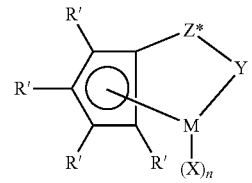

wherein:—
R' each occurrence is independently selected from hydrogen, hydrocarbyl, silyl, germyl, halo, cyano, and combinations thereof, said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is hydride or a moiety selected from the group consisting of halo, alkyl, aryl, aryloxy, alkoxy, alkoxyalkyl, amidoalkyl, siloxyalkyl etc. having up to 20 non-hydrogen atoms and neutral Lewis base ligands having up to 20 non-hydrogen atoms, Y is —O—, —S—, —NR*—, —PR*—, M is hafnium, titanium or zirconium, Z* is SiR*₂, CR*₂, SiR*₂SiR*₂, CR*₂CR*₂, CR*═CR*, CR*₂SiR*₂, or GeR*₂, wherein:
R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system, and n is 1 or 2 depending on the valence of M.

Examples of suitable monocyclopentadienyl complexes are (tert-butylamido) dimethyl(tetramethyl-η⁵-cyclopentadienyl) silanetitanium dichloride and (2-methoxyphenylamido)dimethyl(tetramethyl-η⁵-cyclopentadienyl)silanetitanium dichloride.

Particularly preferred metallocene complexes for use in the preparation of the copolymers of the present invention may be represented by the general formula:

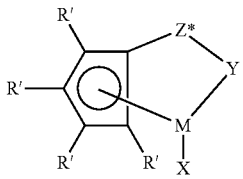

wherein:—
R' each occurrence is independently selected from hydrogen, hydrocarbyl, silyl, germyl, halo, cyano, and combinations thereat said R' having up to 20 nonhydrogen atoms, and optionally, two R' groups (where R' is not hydrogen, halo or cyano) together form a divalent derivative thereof connected to adjacent positions of the cyclopentadienyl ring to form a fused ring structure;

X is a neutral η⁴ bonded diene group having up to 30 non-hydrogen atoms, which forms a π-complex with M;

Y is —O—, —S—, —NR*—, —PR*—,

M is titanium or zirconium in the +2 formal oxidation state;

Z* is SiR*₂, CR*₂, SiR*₂SIR*₂, CR*₂CR*₂, CR*=CR*, CR*₂SiR*₂, or

GeR*₂, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system.

Examples of suitable X groups include s-trans-η⁴-1,4-diphenyl-1,3-butadiene; s-trans-η⁴-3-methyl-1,3-pentadiene; s-trans-η⁴-2,4-hexadiene; s-trans-η⁴-1,3-pentadiene; s-trans-η⁴-1,4-ditolyl-1,3-butadiene; s-trans-η⁴-1,4-bis(trimethylsilyl)-1,3-butadiene; s-cis-η⁴-3-methyl-1,3-pentadiene; s-cis-η⁴-1,4-dibenzyl-1,3-butadiene; s-cis-η⁴-1,3-pentadiene; s-cis-η⁴-1,4-bis(trimethylsilyl)-1,3-butadiene, said s-cis diene group forming a π-complex as defined herein with the metal.

Most preferably R' is hydrogen, methyl, ethyl, propyl, butyl, pentyl, hexyl, benzyl, or phenyl or 2 R' groups (except hydrogen) are linked together, the entire C₅R'₄ group thereby being, for example, an indenyl, tetrahydroindenyl, fluorenyl, terahydrofluorenyl, or octahydrofluorenyl group.

Highly preferred Y groups are nitrogen or phosphorus containing groups containing a group corresponding to the formula —N(R″)— or —P(R″)— wherein R″ is C₁₋₁₀ hydrocarbyl.

Most preferred complexes are amidosilane- or amidoalkanediyl complexes.

Most preferred complexes are those wherein M is titanium.

Specific complexes are those disclosed in WO 95/00526 and are incorporated herein by reference.

A particularly preferred complex is (t-butylamido) (tetramethyl-η⁵-cyclopentadienyl)dimethyl silanetitanium-η⁴-1.3-pentadiene.

Suitable cocatalysts for use in the preparation of the novel copolymers of the present invention are those typically used with the aforementioned metallocene complexes.

These include aluminoxanes such as methyl aluminoxane (MAO), boranes such as tris(pentafluorophenyl) borane and borates.

Aluminoxanes are well known in the art and preferably comprise oligomeric linear and/or cyclic alkyl aluminoxanes. Aluminoxanes may be prepared in a number of ways and preferably are prepare by contacting water and a trialkylaluminium compound, for example trimethylaluminium, in a suitable organic medium such as benzene or an aliphatic hydrocarbon.

A preferred aluminoxane is methyl aluminoxane (MAO).

Other suitable cocatalysts are organoboron compounds in particular triarylboron compounds. A particularly preferred triarylboron compound is tris(pentafluorophenyl) borane.

Other compounds suitable as cocatalysts are compounds which comprise a cation and an anion. The cation is typically a Bronsted acid capable of donating a proton and the anion is typically a compatible non-coordinating bulky species capable of stabilizing the cation.

Such cocatalysts may be represented by the formula:

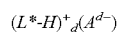

wherein:—
L″ is a neutral Lewis base
$(L^*\text{-}H)^+_d$ is a Bronsted acid
$A^{d-}$ is a non-coordinating compatible anion having a charge of d⁻, and
d is an integer from 1 to 3.

The cation of the ionic compound may be selected from the group consisting of acidic cations, carbonium cations, silylium cations, oxonium cations, organometallic cations and cationic oxidizing agents.

Suitably preferred cations include trihydrocarbyl substituted ammonium cations eg. triethylammonium, tripropylammonium, tri(n-butyl)ammonium and similar. Also suitable are N,N-dialkylanilinium cations such as N,N-dimethylanilinium cations.

The preferred ionic compounds used as cocatalysts are those wherein the cation of the ionic compound comprises a hydrocarbyl substituted ammonium salt and the anion comprises an aryl substituted borate.

Typical borates suitable as ionic compounds include:
triethylammonium tetraphenylborate
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
N,N-dimethylanilinium tetrakis(pentafluorophenyl) borate,
N,N-diethylanilinium tetrakis(pentafluorophenyl) borate.

A preferred type of cocatalyst suitable for use with the metallocene complexes comprise ionic compounds comprising a cation and an anion wherein the anion has at least one substituent comprising a moiety having an active hydrogen.

Suitable cocatalysts of this type are described in WO 98/27119 the relevant portions of which are incorporated herein by reference.

Examples of this type of anion include:
triphenyl(hydroxyphenyl)borate
tri(p-tolyl)(hydroxyphenyl)borate
tris(pentafluorophenyl)(hydroxyphenyl)borate
tris(pentafluorophenyl)(4-hydroxyphenyl)borate Examples of suitable cations for this type of cocatalyst include triethylammonium, tnisopropylammonium, diethylmethylammonium, dibutylethylammonium and similar.

Particularly suitable are those cations having longer alkyl chains such as dihexyldecylmethylammonium, dioctadecylmethylammonium, ditetradecylmethylammonium, bis(hydrogenated tallow alkyl)methylammonium and similar.

Particular preferred cocatalysts of this type are alkylammonium tris(pentafluorophenyl) 4-(hydroxyphenyl) borates. A particularly preferred cocatalyst is bis(hydrogenated tallow alkyl)methyl ammonium tris(pentafluorophenyl) (4-hydroxyphenyl) borate.

With respect to this type of cocatalyst, a preferred compound is the reaction product of an alkylammonium tris(pentafluorophenyl)-4-(hydroxyphenyl) borate and an organometallic compound, for example triethylaluminium or an aluminoxane such as tetraisobutylaluminoxane.

The catalysts used to prepare the novel copolymers of the present invention may suitably be supported.

Suitable support materials include inorganic metal oxides or alternatively polymeric supports may be used for example polyethylene, polypropylene, clays, zeolites, etc.

The most preferred support material for use with the supported catalysts according to the method of the present invention is silica. Suitable silicas include Ineos ES70X and Grace Davison 948 silicas.

The support material may be subjected to a heat treatment and/or chemical treatment to reduce the water content or the hydroxyl content of the support material. Typically chemical dehydration agents are reactive metal hydrides, aluminium alkyls and halides. Prior to its use the support material may be subjected to treatment at 100° C. to 1000° C. and preferably at 200 to 850° C. in an inert atmosphere under reduced pressure.

The porous supports are preferably pretreated with an organometallic compound preferably an organoaluminum compound and most preferably a trialkylaluminium compound in a dilute solvent.

The support material is pretreated with the organometallic compound at a temperature of −20° C. to 150° C. and preferably at 20° C. to 100° C.

Suitable catalysts for use in the preparation of the copolymers of the present invention further comprise metallocene complexes which have been treated with polymerisable monomers. Our earlier applications WO 04/020487 and WO 05/019275 describe supported catalyst compositions wherein a polymerisable monomer is used in the catalyst preparation.

Polymerisable monomers suitable for use in this aspect of the present invention include ethylene, propylene, 1-butene, 1-hexene, 1-octene, 1-decene, styrene, butadiene, and polar monomers for example vinyl acetate, methyl methacrylate, etc. Preferred monomers are those having 2 to 10 carbon atoms in particular ethylene, propylene, 1-butene or 1-hexene.

Alternatively a combination of one or more monomers may be used for example ethylene and 1-hexene.

The preferred polymerisable monomer is 1-hexene.

The polymerisable monomer is suitably used in liquid form or alternatively may be used in a suitable solvent. Suitable solvents include for example heptane.

The polymerisable monomer may be added to the cocatalyst before addition of the metallocene complex or alternatively the complex may be pretreated with the polymerisable monomer.

The novel copolymers of the present invention may suitably be prepared by any suitable polymerization processes but are preferably prepared in the slurry phase.

A slurry process typically uses an inert hydrocarbon diluent and temperatures from about 0° C. up to a temperature just below the temperature at which the resulting polymer becomes substantially soluble in the inert polymerization medium. Suitable diluents include toluene or alkanes such as hexane, propane or isobutane. Preferred temperatures are from about 30° C. up to about 200° C. but preferably from about 60° C. to 100° C. Loop reactors are widely used in slurry polymerization processes.

The copolymers of the present invention are suitably prepared in a multistage polymerization process wherein a plurality of reactors in series may be used. In a typical process a catalyst, ethylene and α-olefin are polymerized in a suitable diluent in a first reactor and a suspension comprising polyolefin particles is continuously withdrawn from said first reactor to a second reactor optionally with additional diluent and/or catalyst wherein further polymerization takes place.

Descriptions of polymerisation reactors suitable for use in the present invention may be found in our earlier applications EP 1922342, EP 2038345 and EP 2123682 the relevant parts of which are incorporated herein by reference.

The second reactor may preferably be separated from the first reactor by a device making it possible to continuously carry out a reduction in pressure. Suitable devices are described in the aforementioned prior applications.

The novel polymers of the present invention have defined polymer fractions. The preferred amount of polymer fraction (A) is in the range 40-60% and preferably in the range 44-55%. Preferred amounts of Polymer fraction (B) are in the range 40-60% and preferably in the range 44-55%. The polymer fractions are defined as being the total weight of each component produced based on the total weight of polymer.

Thus according to another aspect of the present invention there is provided a process for the preparation of copolymers as hereinbefore described, said process comprising copolymerizing ethylene and α-olefins in the presence of a catalyst system in a multistage polymerization process.

Preferably the number of reactors is two.

Preferred reactors are loops reactors.

The process of the present invention may also include a prepolymerization stage wherein the catalyst, ethylene and α-olefin are prepolymerized in a suitable diluent in a prepolymerzation reactor and wherein the resultant prepolymer is continuously withdrawn from the prepolymerisation reactor and introduced into the first reactor.

Conventional polymers with long chain branching (e.g., high pressure LDPE: LD5310AA) and/or with broadening molecular weight distribution (e.g., Ziegler Natta bimodal resins) exhibit excellent Processability (e.g., in film blowing), but their mechanical properties (e.g., Dart Drop Impact strength) are usually compromised to poorer performance.

The copolymers of the present invention result in an excellent balance of properties in particular improved processing as defined by the relationship between the Dow Rheology Index (DRI) and melt index, with broad molecular weight distribution, and also improved mechanical properties of resultant films as seen from the Dart Drop Impact (DDI). Such copolymers produced in multistage slurry phase reactors particularly show such improvements when compared with copolymers produced in a single gas phase reactor.

The present invention will now be further illustrated with reference to the following examples:

Reagents
TEA Triethylaluminium
TMA Trimethylaluminium
Ionic Compound A [N(H)Me($C_{18-22}H_{37-45}$)$_2$][B($C_6F_5$)$_3$(p-OH$C_6H_4$)]
Complex A ($C_5Me_4SiMe_2N^tBu$)Ti($\eta^4$-1,3-pentadiene
CHEMAX X-997 Antistatic agent, commercially available (PPC CHEMAX, Inc.)
Octastat 2000 Antistatic agent, commercially available from Innospec, Inc

EXAMPLE 1

Catalyst A

To 9.0 Kg of silica ES70X (available from Ineos), previously calcined at 400° C. for 5 hours, in 90 liters of hexane was added 20.26 Kg of 0.5 mol Al/liter of TEA in hexane. After 1.5 hours stirring at 30° C. the silica was allowed to settle and the supernatant was removed by decantation. The residue was then washed five times with 130 liters hexane and reslurried in 130 liters hexane. Then 1 liter of an Octastat 2000 solution in pentane (2 g/l) was added and the slurry was stirred for 15 rains.

8.38 Kg of a toluene solution of Ionic Compound A (10.09% wt) was cooled to 15° C. and 330 g of a hexane solution of TMA (10 wt %) were added over 10 mins. After stirring for a further 140 mins at 15° C., the solution was transferred to the slurry containing the TEA-treated silica from the previous step. The resulting mixture was well agitated for 1 hour at 27° C. Then 2.63 Kg of a heptane solution of Complex A (9.31% wt) were added over a period of 30 minutes and the mixture was well agitated for another 70 mins at 27° C. Then the slurry was allowed to settle and the supernatant was removed by decantation. The residue was then washed three times with 150 liters hexane and dried in vacuum at 45° C. until a free flowing green powder was obtained
[Al]=1.05 mmol/g
[Ti]=39 µmol/g

EXAMPLE 2

Catalyst B

To 9.8 Kg of silica ES70X (available from Ineos), previously calcined at 400° C. for 5 hours, in 90 liters of hexane was added 20.37 Kg of 0.5 mol Al/liter of TEA in hexane. After 1.5 hours stirring at 30° C. the silica was allowed to settle and the supernatant was removed by decantation. The residue was then washed four times with 150 liters hexane and reslurried in 150 liters hexane. Then 1 liter of an Octastat 2000 solution in pentane (2 g/l) was added and the slurry was stirred for 15 mins.

8.04 Kg of a toluene solution of Ionic Compound A (10.94% wt) was cooled to 12° C. and 540 mL of a hexane solution of TMA ([Al]=1.0 mol/l) were added over 10 mins. After stirring for a further 20 mins at 12° C., the solution was transferred to the slurry containing the TEA-treated silica from the previous step. The resulting mixture was well agitated for 3 hours at 20° C. Then 2.59 Kg of a heptane solution of Complex A (9.51% wt) were added over a period of 30 minutes and the mixture was well agitated for another 3 hours at 20° C. Then the slurry was allowed to settle and the supernatant was removed by decantation. The residue was then washed three times with 150 liters hexane and dried in vacuum at 45° C. until a free flowing green powder was obtained
[Al]=0.83 mmol/g
[Ti]=49 µmol/g Preparation of the Polyethylene Resins The manufacture of the polymer resins according to the present invention was carried out in suspension in isobutane in a multistage reaction in two loop reactors of 200 L and 300 L volume respectively, further comprising a prepolymerisation in isobutane in a 40 L loop reactor. The reactors were connected in series, the slurry from the prepolymerisation reactor was transferred directly to the first loop reactor. The second loop reactor was separated from the first loop reactor by a device making it possible to continuously carry out a reduction in pressure.

Isobutane, ethylene, hydrogen, TiBAl (10 ppm) and the catalyst prepared in as described above were continuously introduced into the prepolymerisation reactor and the polymerisation of ethylene was carried out in this mixture in order to form the prepolymer (P). The mixture, additionally comprising the prepolymer (P), was continuously withdrawn from the said prepolymerisation reactor and introduced via a flexible pipe into the first reactor. Additional isobutane, ethylene, hydrogen TiBAl (10 ppm), 1-hexene and optionally an antistatic agent were continuously introduced into the first loop reactor and the copolymerization of ethylene and 1-hexene was carried out in this mixture in order to obtain a first ethylene/1-hexene copolymer (A). The mixture, additionally comprising the first polymer (A) was continuously withdrawn from said first reactor and subjected to a reduction in pressure (~45° C., 6.0 bar), so as to remove at least a portion of the hydrogen. The resulting mixture, at least partially degassed of hydrogen, was then continuously introduced into a second polymerisation reactor, at the same time as ethylene, 1-hexene, isobutane, hydrogen and optionally an antistatic agent, and the copolymerisation of ethylene and 1-hexene was carried out therein in order to form the ethylene/1-hexene copolymer (B). The suspension comprising the composition comprising ethylene polymers was continuously withdrawn from the second reactor and this suspension was subjected to a final reduction in pressure, so as to flash the isobutane and the reactants present (ethylene, 1-hexene and hydrogen) and to recover the composition in the feint of a dry powder, which was subsequently degassed to pursue the removal of residual hydrocarbons. The other polymerisation conditions and copolymer properties are specified in Table 1 for examples 3-6 using the above catalysts A and B.

EXAMPLES 3-6

TABLE 1

| EXAMPLE | 3 | 4 | 5 | 6 |
|---|---|---|---|---|
| Catalyst | A | B | B | B |
| PREPOLYMERIZATION | | | | |
| Isobutane (L/h) | 74 | 68 | 68 | 68 |
| $C_2$ (kg/h) | 1.3 | 1.2 | 1.2 | 1.2 |
| $H_2$ (g/h) | 0.5 | 0.3 | 0.4 | 0.4 |
| T (° C.) | 27.6 | 25.0 | 25.5 | 26.5 |
| Residence time (h) | 0.54 | 0.59 | 0.59 | 0.59 |
| Prepolymer P fraction (% wt) | 1 | 1 | 1 | 1 |
| REACTOR 1 | | | | |
| Isobutane (L/h) | 124 | 118 | 118 | 118 |
| $C_2$ (kg/h) | 20.0 | 20.0 | 20.0 | 20.0 |

TABLE 1-continued

| EXAMPLE | 3 | 4 | 5 | 6 |
|---|---|---|---|---|
| 1-Hexene (kg/h) | 1.5 | 0.8 | 0.9 | 0.9 |
| $H_2$ (g/h) | 5.5 | 2.0 | 2.8 | 2.9 |
| CHEMAX X-997 (ppm) | — | 7.7 | 9.9 | 9.9 |
| T (° C.) | 65.0 | 65.0 | 65.0 | 65.0 |
| Pressure (bar) | 38.2 | 37.3 | 38.0 | 38.1 |
| Residence time (h) | 1.27 | 1.34 | 1.34 | 1.34 |
| Polymer A fraction (% wt) | 44 | 49 | 49.5 | 55 |
| REACTOR 2 | | | | |
| Isobutane (L/h) | 177 | 159 | 153 | 152 |
| $C_2$ (kg/h) | 31.5 | 21.9 | 22.0 | 17.9 |

TABLE 1-continued

| EXAMPLE | 3 | 4 | 5 | 6 |
|---|---|---|---|---|
| 1-Hexene (kg/h) | 3.8 | 5.3 | 6.1 | 5.6 |
| $H_2$ (g/h) | 4.0 | 1.7 | 1.3 | 1.0 |
| CHEMAX X-997 (ppm) | 5.3 | 5.9 | 7.9 | 7.9 |
| T (° C.) | 75.0 | 75.0 | 75.0 | 75.0 |
| Pressure (bar) | 35.7 | 35.9 | 36.2 | 35.8 |
| Residence time (h) | 1.20 | 1.36 | 1.40 | 1.43 |
| Polymer B fraction (% wt) | 55 | 50 | 49.5 | 44 |
| Productivity (g PE/g catalyst) | 2125 | 6197 | 6407 | 6097 |

The resultant polymers were analysed and the resultant polymer properties are shown below in Table 2.

TABLE 2

| EXAMPLE | 3 | 4 | 5 | 6 |
|---|---|---|---|---|
| Copolymer A properties | | | | |
| Density (g/cm$^3$) | 0.9398 | 0.9398 | 0.9405 | 0.9397 |
| Melt Index MI (8/1)# copolymer A (g/10 min) | 13.0 | | | |
| Melt Index $MI_2$ copolymer A (g/10 min) | | 1.45 | 5.90 | 5.40 |
| Final resin properties | | | | |
| Density (g/cm$^3$) | 0.9327 | 0.9227 | 0.9196 | 0.9205 |
| Melt Index $MI_2$(g/10 min) | 0.35 | 0.62 | 0.64 | 0.69 |
| Melt elastic modulus G' (G" = 500 Pa), (Pa) | 92 | 98 | 107 | 107 |
| Dow Rheology Index (DRI) | 1.8 | 11.7 | 9.2 | 13.6 |
| DRI/MI | 5.3 | 18.9 | 14.4 | 19.8 |
| DDI (g) | | 1265 | 2200 | 2030 |
| RHS of DDI equation* | 332 | 1249 | 1596 | 1505 |
| Mw (Da) | 152000 | 156000 | 177000 | 159000 |
| Mz (Da) | 487000 | 429000 | 543000 | 545000 |
| Mw/Mn | 11.3 | 4.8 | 4.9 | 6.3 |
| SCB (per 1000 C) | 7.3 | 8.8 | 13.5 | 12.8 |
| $C_{pf}$ | 1.0 | 1.52 | 1.64 | 2.09 |

*RHS = Right Hand Side
DDI equation: $DDI \geq 19000 \times \{1 - \mathrm{Exp}[-750(D - 0.908)^2]\} \times \{\mathrm{Exp}[(0.919 - D)/0.0045]\}$
Melt index MI (8/1) = measurements using die of length L = 8.0 mm and diameter D = 1.0 mm, in accordance to ISO 1133 at 190° C. using loads of 2.16 kg.

COMPARATIVE EXAMPLES

Comparative examples are shown in Table 3 as follows:
Example CE1 (example 2 from WO 06/085051)
Example CE2 (example 4 from WO 06/085051)
Example CE3 (example 6 from WO 08/074,689)
Example CE4 (LD5310AA from WO 99/35174)
Example CE5 (Borealis FB2230)
Example CE6 (Borealis FB2310)

The copolymers in examples CE1-CE3 were prepared by use of a monocyclopentadienyl metallocene complex in a gas phase process performed in a single reactor. Example CE4 represents a low density polymer prepared by a high pressure process. Commercial samples CE5 and CE6 are understood to be prepared by a slurry/gas phase two reactor process

TABLE 3

| | EXAMPLE | | | | | |
|---|---|---|---|---|---|---|
| | CE1 | CE2 | CE3 | CE4 | CE5 | CE6 |
| Density (g/cm$^3$) | 0.9194 | 0.9181 | 0.9213 | 0.9230 | 0.9227 | 0.9311 |
| Melt Index $MI_2$(g/10 min) | 1.20 | 0.95 | 1.37 | 1.00 | 0.20 | 0.17 |
| Melt elastic modulus G' (G" = 500 Pa), (Pa) | 51 | 64 | 47.3 | 75.7 | 135 | 130 |
| Dow Rheology Index (DRI) | 0.898 | 2.118 | 0.321 | 4.80 | 7.04 | 6.95 |
| DRI/MI | 0.748 | 2.229 | 0.234 | 4.80 | 35.55 | 41.14 |

TABLE 3-continued

|  | EXAMPLE | | | | | |
| --- | --- | --- | --- | --- | --- | --- |
|  | CE1 | CE2 | CE3 | CE4 | CE5 | CE6 |
| DDI (g) | 2250 | 1323 | 1707 | 150 | 300 | 300 |
| RHS of DDI equation* | 1614 | 1709 | 1416 | 1213 | 1249 | 426 |
| Mw (Da) | 105000 | 115000 | 106000 | 137500 | 216000 | 223000 |
| Mz (Da) | 235000 | 265000 | 229000 |  | 1528000 | 1428000 |
| Mw/Mn | 3.8 | 3.8 | 4.0 | 7.0 | 17.4 | 20.4 |
| SCB (per 1000 C) |  |  |  |  | 17.2 | 14.5 |
| $C_{pf}$ |  |  |  |  | 1.84 | 2.06 |

*RHS = Right Hand Side
DDI equation: DDI ≥ 19000 × {1 − Exp [−750(D − 0.908)$^2$]} × {Exp [(0.919 − D)/0.0045]}

Methods of Test

Melt index Mb was measured according to ISO 1133 at 190° C. using loads of 2.16 kg.

Density of the polyethylene was measured according to ISO 1183-1 (Method A) and the sample plaque was prepared according to ASTM D4703 (Condition C) where it was cooled in the press under pressure (100 bars) at a cooling rate of 15° C./min from 190° C. to 40° C.

Dynamic Rheological Analysis

To characterize the rheological behavior of substantially linear ethylene polymers, S Lai and G. W. Knight introduced (ANTEC '93 Proceedings, Insite™ Technology Polyolefins (ITP)-New Rules in the Structure/Rheology Relationship of Ethylene &-Olefin Copolymers, New Orleans, La., May 1993) a new rheological measurement, the Dow Rheology Index (DRI) which expresses a polymer's "normalized relaxation time as the result of long chain branching". S. Lai et al; (Antec '94, Dow Rheology Index (DRI) for Insite™ Technology Polyolefins (ITP): Unique structure-Processing Relationships, pp. 1814-1815) defined the DRI as the extent to which the rheology of ethylene-octene copolymers known as ITP (Dow's Insite Technology Polyolefins) incorporating long chain branches into the polymer backbone deviates from the rheology of the conventional linear homogeneous polyolefins that are reported to have no Long Chain Branches (LCB) by the following normalized equation:

$$DRI = [365000(\tau_0/\eta_0) - 1]/10$$

wherein $\tau_0$ is the characteristic relaxation time of the material and $\eta_0$ is the zero shear viscosity of the material. The DRI is calculated by least squares fit of the rheological curve (dynamic complex viscosity versus applied frequency eg. 0.01-100 rads/s) as described in U.S. Pat. No. 6,114,486 with the following generalized Cross equation, i.e.

$$\eta(\omega) = \eta_0/[1 + (\omega \tau_0)^n]$$

wherein n is the power law index of the material, $\eta(\omega)$ and $\omega$ are the measured complex viscosity and applied frequency data respectively.

Dynamic rheological measurements are carried out, according to ASTM D 4440, on a dynamic rheometer (e.g., ARES) with 25 mm diameter parallel plates in a dynamic mode under an inert atmosphere. For all experiments, the rheometer has been thermally stable at 190° C. for at least 30 minutes before inserting the appropriately stabilised (with anti-oxidant additives), compression-moulded sample onto the parallel plates. The plates are then closed with a positive normal force registered on the meter to ensure good contact. After about 5 minutes at 190° C., the plates are lightly compressed and the surplus polymer at the circumference of the plates is trimmed. A further 10 minutes is allowed for thermal stability and for the normal force to decrease back to zero. That is, all measurements are carried out after the samples have been equilibrated at 190° C. for about 15 minutes and are run under full nitrogen blanketing.

Two strain sweep (SS) experiments are initially carried out at 190° C. to determine the linear viscoelastic strain that would generate a torque signal which is greater than 10% of the lower scale of the transducer, over the full frequency (e.g. 0.01 to 100 rad/s) range. The first SS experiment is carried out with a low applied frequency of 0.1 rad/s. This test is used to determine the sensitivity of the torque at low frequency. The second SS experiment is carried out with a high applied frequency of 100 rad/s. This is to ensure that the selected applied strain is well within the linear viscoelastic region of the polymer so that the oscillatory rheological measurements do not induce structural changes to the polymer during testing. In addition, a time sweep (TS) experiment is carried out with a low applied frequency of 0.1 rad/s at the selected strain (as determined by the SS experiments) to check the stability of the sample during testing.

Measurement of Melt Elastic Modulus G'(G"=500 Pa) at 190° C.:

The frequency sweep (FS) experiment is then carried out at 190° C. using the above appropriately selected strain level and the dynamic theological data thus measured are then analysed using the rheometer software (viz., Rheometrics RHIOS V4.4 or Orchestrator Software) to determine the melt elastic modulus G'(G"=500 Pa) at a constant, reference value (500 Pa) of melt viscous modulus (G").

Gel Permeation Chromatography Analysis for Molecular Weight Distribution Determination Apparent molecular weight distribution and associated averages, uncorrected for long chain branching, were determined by Gel Permeation Chromatography using a Waters 150CV, with 4 Waters HMW 6E columns and a differential refractometer detector. The solvent used was 1,2,4 Trichlorobenzene at 135° C., which is stabilised with BHT, of 0.2 g/liter concentration and filtered with a 0.45 μm Osmonics Inc. silver filter. Polymer solutions of 1.0 g/liter concentration were prepared at 160° C. for one hour with stirring only at the last 30 minutes. The nominal injection volume was set at 400 μl and the nominal flow rate was 1 ml/min.

A relative calibration was constructed using 13 narrow molecular weight linear polystyrene standards:

| PS Standard | Molecular Weight |
| --- | --- |
| 1 | 7 520 000 |
| 2 | 4 290 000 |
| 3 | 2 630 000 |
| 4 | 1 270 000 |
| 5 | 706 000 |
| 6 | 355 000 |

-continued

| PS Standard | Molecular Weight |
|---|---|
| 7 | 190 000 |
| 8 | 114 000 |
| 9 | 43 700 |
| 10 | 18 600 |
| 11 | 10 900 |
| 12 | 6 520 |
| 13 | 2 950 |

The elution volume, V, was recorded for each PS standards. The PS molecular weight was then converted to PE equivalent using the following Mark Houwink parameters $k_{ps}=1.21\times 10^{-4}$, $\alpha_{ps}=0.707$, $k_{pe}=3.92\times 10^{-4}$, $\alpha_{pe}=0.725$. The calibration curve $Mw_{PE}=f(V)$ was then fitted with a first order linear equation. All the calculations are done with Millennium 3.2 software from Waters.

The very low molecular weight fractions (below 1000 Daltons) were routinely excluded in the calculation of number average molecular weight, Mn, and hence the polymer polydispersity, Mw/Mn, in order to improve integration at the low end of the molecular weight curve, leading to a better reproducibility and repeatability in the extraction and calculation these parameters.

Determination of $C_{pf}$ (a) Comonomer or Short Chain Branching (SCB) Distribution by GPC/FTIR Measurement of Comonomer (SCB) Content vs. Molecular Weight The comonomer content as a function of molecular weight was measured by coupling a Nicolet ESP protégé 460 Fourier transform infrared spectrometer (FTIR) to Polymer Laboratories (PL 210) Gel Permeation Chromatograph (GPC) with a transfer line thermally controlled at 160° C. The setting up, calibration and operation of this system together with the method for data treatment are summarised below:

Preparation of Polymer Solution (in a Heat Block with Constant Agitation):
  Polymer Concentration: 2 g/l (20 mg in a vial of 10 ml)
  Solvent: 1,2,4 trichlorobenzene «dry» of Biosolve and stabilized with BHT (ionol CP) at 01 g/l
  Dissolution temperature: 160° C.
  Duration: 1 h (30 minutes without agitation and 30 minutes with agitation at 150 revolutions/minute)

GPC Conditions (PL 210 Polymer Laboratories)
  Columns set: 2 PL mixed-B (30 cm length 30; 10 µm beads; 5 µm sintered)
  Mobile Phase: 1,2,4 trichlorobenzene «dry» of Biosolve and non-stabilised
  Oven Temperature: 160° C.
  Flow rate: 1 ml/min
  Injection Volume: 500 µl
  Transfer line temperature: 160° C.

FTIR (Nicolet Protégé 460) Spectrometer
  Flow cell commercialised by PL Laboratories and placed inside the Nicolet spectrometer:
    Flow cell volume: 70 µl
    Flow cell path: 1 mm
    Flow cell window: calcium fluoride
    FTIR Detector: InSb cooled by liquid nitrogen
    Number of scan: 16
    Resolution: 4 cm$^{-1}$
    Spectral Range: 3000 to 2700 cm$^{-1}$ Software
  Software acquisition spectres: OMNIC (version 6.0) from Thermo-Nicolet Software exploitation: CIRRUS from Polymer Laboratories (Cirrus GPC/multidetector 2001-2003).

Calibration

The apparent molecular weights, and the associated averages and distribution, uncorrected for long chain branching, were determined by Gel Permeation Chromatography using a PL210, with 2 PL mixed-B and a FTIR (InSb) detector. The solvent used was 1,2,4 Trichlorobenzene at 160° C., which is stabilised with BHT, of 0.2 g/liter concentration and filtered with a 0.45 µm Osmonics Inc. silver filter. Polymer solutions of 2.0 g/liter concentration were prepared at 160° C. for one hour with stirring only at the last 30 minutes. The nominal injection volume was set at 500 µl and the nominal flow rate was 1 ml/min.

A relative calibration was constructed using 10 narrow molecular weight linear polystyrene standards:

| PS Standard | Molecular Weight |
|---|---|
| 1 | 7 500 000 |
| 2 | 2 560 000 |
| 3 | 841 700 |
| 4 | 280 500 |
| 5 | 143 400 |
| 6 | 63 350 |
| 7 | 31 420 |
| 8 | 9 920 |
| 9 | 2 930 |
| 10 | 580 |

The elution volume, V, was recorded for each PS standards. The PS molecular weight was then converted to PE equivalent using the following Mark Houwink parameters $k_{ps}=1.21\times 10^{-4}$, $\alpha_{ps}=0.707$, $k_{pe}=3.92\times 10^{-4}$, $\alpha_{pe}=0.725$. The calibration curve $Mw_{PE}=f(V)$ was then fitted with a first order linear equation.

Calibration IR for Short Chain Branching (SCB)

The chemometric model employed within the Polymer Laboratories Softwares (e.g., CIRRUS, GPC/Multidetector) involved the calibration of the FTIR detector using Standards, including the following:

| Standard | CH$_3$/1000 C |
|---|---|
| CF24-7 | 15.4 |
| CF24-10 | 11.1 |
| CF 25-24 | 9.4 |
| CF25-1 | 1.3 |
| CF25-3 | 2.7 |
| CF25-5 | 3.7 |
| CF25-6 | 4.2 |

In order to characterize the degree to which the comonomer is concentrated in the high molecular weight part of the polymer, the GPC/FTIR data were used to calculate a parameter named comonomer partitioning factor, $C_{pf}$.

(b) Comonomer Partitioning Factor ($C_{pf}$)

The comonomer partitioning factor ($C_{pf}$) is calculated from GPC/FTIR data, as has previously been described in WO 97/44371 which is herein incorporated by reference. It characterizes the ratio of the average comonomer content of the higher molecular weight tractions to the average comonomer content of the lower molecular weight fractions. Higher and lower molecular weight are defined as being above or below the median molecular weight respectively, that is, the molecular weight distribution is divided into two parts of equal weight $C_{pf}$ is calculated from the following Equation:

$$C_{pf} = \frac{\frac{\sum_{i=1}^{n} w_i c_i}{\sum_{i=1}^{n} w_i}}{\frac{\sum_{j=1}^{m} w_j c_j}{\sum_{j=1}^{m} w_j}}$$

where $c_i$ is the mole fraction comonomer content and $w_i$ is the normalized weight fraction as determined by GPC/FTIR for then FTIR data points above the median molecular weight. $c_j$ is the mole fraction comonomer content and wj is the normalized weight fraction as determined by GPC/FTIR for the m FTIR data points below the median molecular weight. Only those weight fractions, $w_i$ or $w_j$, which have associated mole fraction comonomer content values are used to calculate $C_{pf}$. For a valid calculation, it is required that n and m are greater than or equal to 3. FTIR data corresponding to molecular weight fractions below 5,000 are not included in the calculation due to the uncertainties present in such data.

Film Characteristics

Blown films of 25 µm thickness were prepared from the polymers prepared in Examples 4 and 6. The details of extrusion conditions and the mechanical and optical properties of the films are given below in Table 4.

TABLE 4

| Polymer | | Example 4 | Example 6 |
|---|---|---|---|
| extrusion parameters | | | |
| Melt pressure (bar) | | 257 | 224 |
| Melt temperature (° C.) | | 216 | 217 |
| Motor load (A) | | 82 | 72 |
| Screw speed (rpm) | | 59 | 62 |
| Air temperature (° C.) | | 23 | 23 |
| Output (kg/h) | | 50 | 50 |
| mechanical properties | | | |
| Dart Drop Impact (dart head) g | | 1265 | 2030 |
| Elmendorf tear strength (g/25 µm) | MD | 227 | 222 |
| | TD | 518 | 454 |
| Tensile stress at yield (MPa) | MD | 11.6 | 10.6 |
| Tensile stress at break (MPa) | MD | 66 | 59.2 |
| Elongation at break (%) (MPa) | MD | 591 | 559 |
| Secant modulus 1% (MPa) | MD | 194 | 193 |
| optical properties | | | |
| haze (%) | | 15.1 | 20.3 |
| gloss 45° (%) | | 43.5 | 32.8 |

Extruder & Extrusion Characteristics
Extruder:

| CMG (Costruzione Meccaniche Gallia) 1200 TSA | |
|---|---|
| Screw diameter | 55 mm |
| Screw L/D ratio | 30 |
| Die diameter/gap | 150/2.2 mm |
| Screen pack | flat |

Extrusion:
Temperature Profile:

| Screw | 200/210/210/210/210° C. |
|---|---|
| Die | 210/210/220/225° C. |
| Output | 50 kg/h |
| Take-off speed | 21 m/min |
| Blow-up ratio | 3.8:1 |
| Frostline height | 430 mm |
| Film thickness | 25 µm |

Dart Drop Impact strength (DDI) was measured by ASTM D1709-98 (Method A), using a Tufnol (Carp Brand to BS.6128) 60 g Dart Head and the diameter of the incremental weights is equal to the diameter of the dart head (38.10 mm), haze by ASTM D1003, gloss) (45° by ASTM D2457, tear strength (Elmendorf) by ASTM 1922, tensile properties and secant modulus (1%) according to ISO 1184.

The invention claimed is:

1. A copolymer of ethylene and an α-olefin said copolymer having
   (a) a density D in the range 0.900-0.940 g/cm³,
   (b) a melt index $MI_2$(2.16 kg, 190° C.) in the range of 0.01-50 g/10 min,
   (c) a melt index $MI_2$(2.16 kg, 190° C.) and Dow Rheology Index (DRI) satisfying the equation $[DRI/MI_2]>2.65$, and (d) a Dart Drop Impact (DDI) in g of a blown film having a thickness of 25 µm produced from the copolymer satisfying the equation $DDI \geq 19000 \times \{1-Exp[-750(D-0.908)^2]\} \times \{Exp[(0.919-D)/0.0045]\}$.

2. A copolymer of ethylene and an α-olefin said copolymer having
   (a) a density (D) in the range 0.900-0.940 g/cm³,
   (b) a melt index $MI_2$(2.16 kg, 190° C.) in the range of 0.01-50 g/10 min,
   (c) a melt elastic modulus G'(G"=500 Pa) in the range 80-120 Pa, and
   (d) a melt index $MI_2$(2.16 kg, 190° C.) and Dow Rheology Index (DRI) satisfying the equation $[DRI/MI_2] \geq 5$.

3. The copolymer according to claim 1 having a density (D) in the range 0.910-0.935 g/cm³.

4. The copolymer according to claim 1 having a melt index $MI_2$ (2.16 kg, 190° C.) in the range of 0.3-50 g/10 min.

5. The copolymer according to claim 1 having a Dow Rheology Index (DRI) in the range 1-15.

6. The copolymer according to claim 1 having a molecular weight distribution in the range 4.0-20.

7. The copolymer according to claim 1 having a comonomer partitioning factor $Cpf \geq 1.0$.

8. The copolymer according to claim 1 having a Dart Drop Impact (DDI)≥1000 g of a blown film having a thickness of 25 µm produced from said copolymer having a density (D) in the range of 0.9118-0.9248.

9. The copolymer according to claim 1 wherein the α-olefin has C4-C12 carbon atoms.

10. The copolymer according to claim 9 wherein the α-olefin is 1-hexene.

11. The copolymer according to claim 3 having a density (D) in the range 0.915-0.933 g/cm³.

12. The copolymer according to claim 4 having a melt index $MI_2$ (2.16 kg, 190° C.) in the range of 0.3-5 g/10 min.

13. The copolymer according to claim 6 having a molecular weight distribution in the range 4.5-12.0.

14. A process for the preparation of copolymers according to claim 1 said process comprising polymerizing ethylene and an α-olefin in the presence of a metallocene catalyst system.

15. The process according to claim 14 wherein the metallocene catalyst system comprises a monocyclopentadienyl metallocene complex.

16. The process according to claim 15 wherein the monocyclopentadienyl metallocene complex has the general formula:

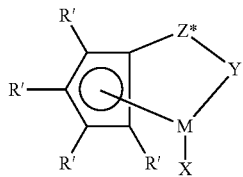

wherein:—
R' each occurrence is independently selected from hydrogen, hydrocarbyl, silyl, germyl, halo, cyano, and combinations thereof, said R' having up to 20 non-hydrogen atoms, and optionally, two R' groups (where R' is not hydrogen, halo or cyano) together form a divalent derivative thereof connected to adjacent positions of the cyclopentadienyl ring to form a fused ring structure;

X is a neutral η4 bonded diene group having up to 30 non-hydrogen atoms, which forms a π-complex with M;

Y is —O—, —S—, —NR*—, —PR*—,

M is titanium or zirconium in the +2 formal oxidation state;

Z* is $SiR^*_2$, $CR^*_2$, $SiR^*_2SiR^*_2$, $CR^*_2CR^*_2$, $CR^*$=$CR^*$, $CR^*_2SiR^*_2$, or $GeR^*_2$, wherein:

R* each occurrence is independently hydrogen, or a member selected from hydrocarbyl, silyl, halogenated alkyl, halogenated aryl, and combinations thereof, said R* having up to 10 non-hydrogen atoms, and optionally, two R* groups from Z* (when R* is not hydrogen), or an R* group from Z* and an R* group from Y form a ring system.

17. The process according to claim 14 performed in the slurry phase.

18. The process according to claim 14 performed in a multistage polymerization process.

19. The process according to claim 18 wherein the number of reactors is two.

20. The process according to claim 19 wherein the reactors are loop reactors.

* * * * *